Oct. 3, 1939.    R. T. BAUGH    2,174,815
COAL CUTTER CHAIN
Original Filed Sept. 15, 1938    2 Sheets-Sheet 1
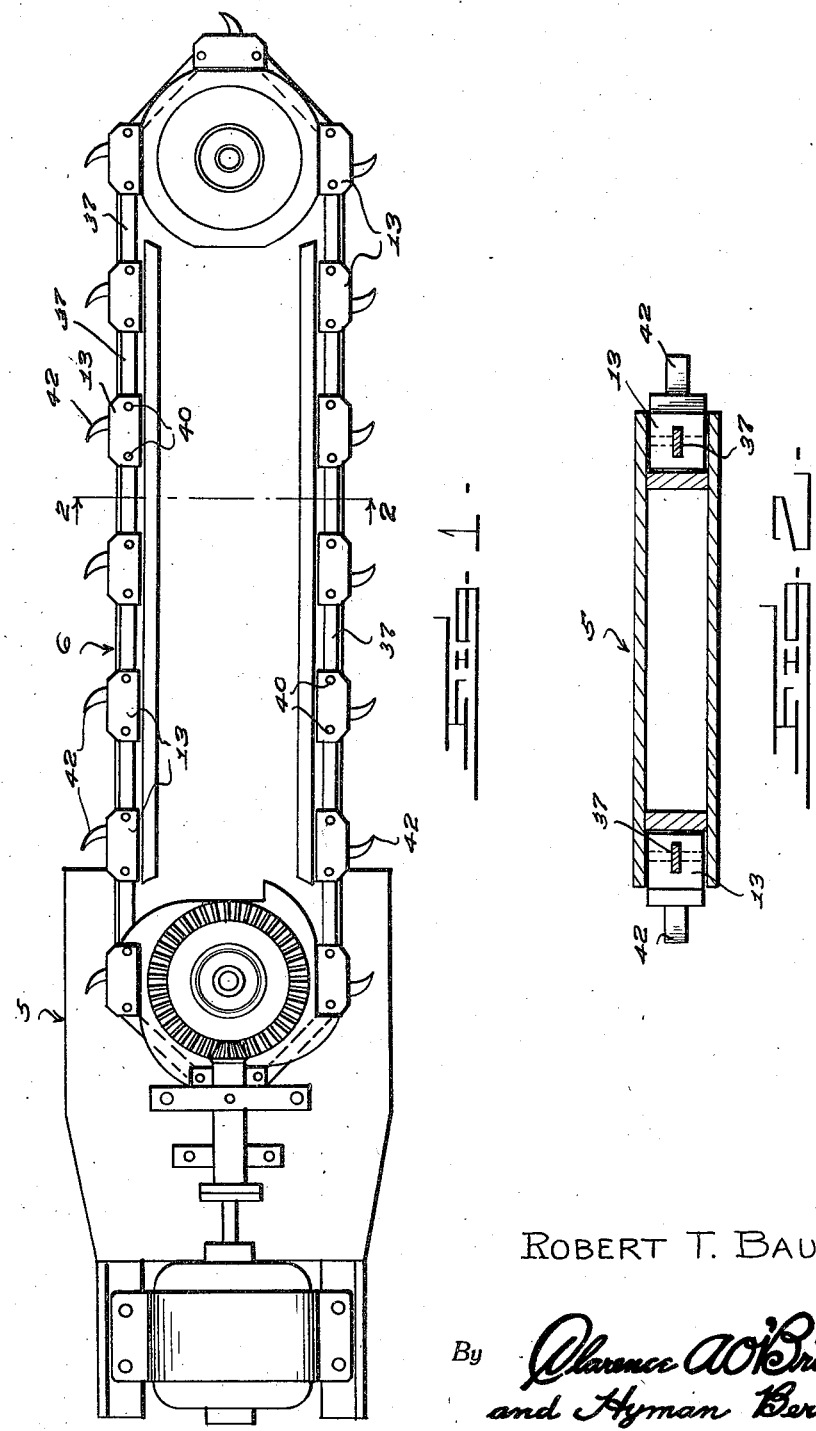
Inventor
ROBERT T. BAUGH,
By Clarence A. O'Brien
and Hyman Berman
Attorneys

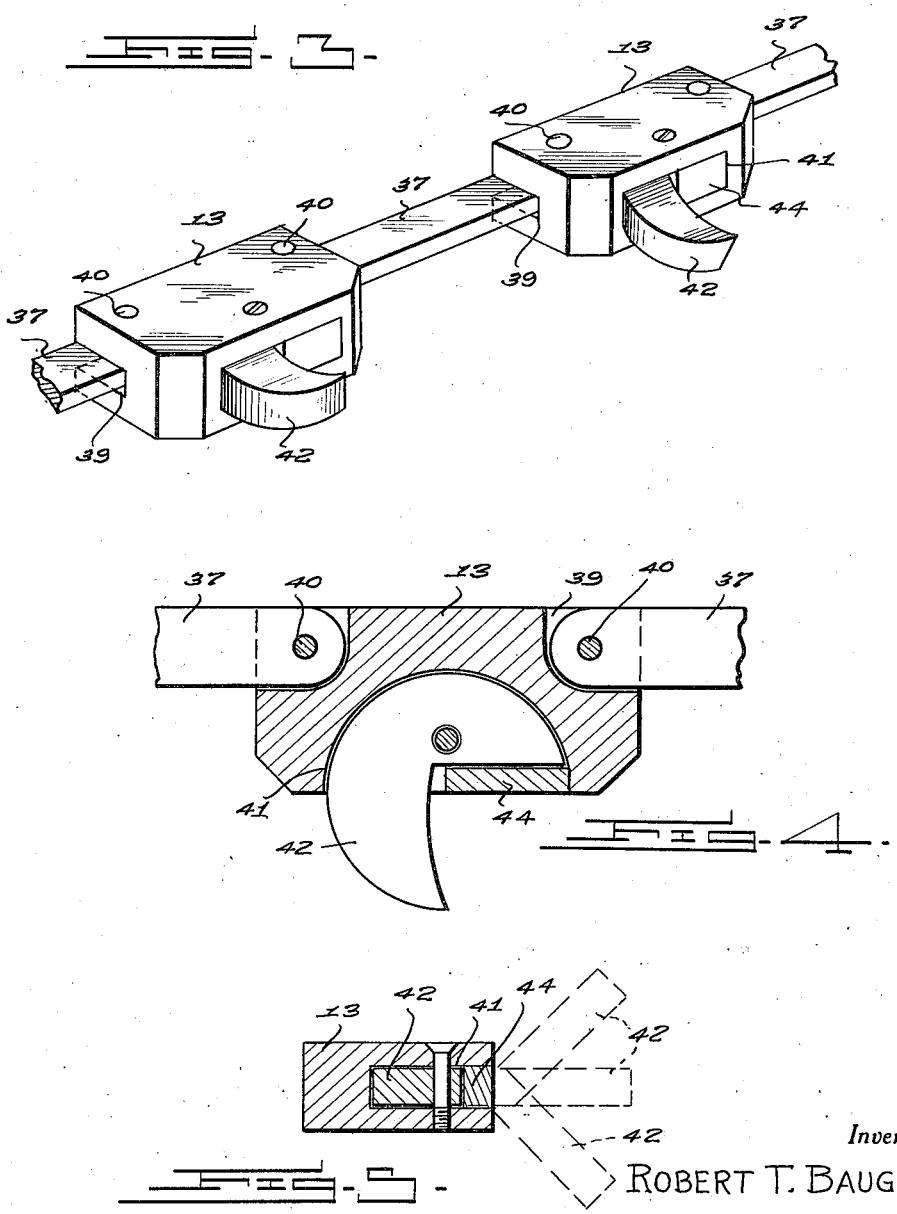

Patented Oct. 3, 1939

2,174,815

UNITED STATES PATENT OFFICE 2,174,815

COAL CUTTER CHAIN

Robert T. Baugh, Huntsville, Ala., assignor to Robert T. Baugh, Jr., Huntsville, Ala.

Original application September 15, 1938, Serial No. 230,116. Divided and this application March 9, 1939, Serial No. 260,850

3 Claims. (Cl. 262—33)

This invention appertains to new and useful improvements in coal cutting chains, this invention being a division of my copending application Serial No. 230,116, filed September 15, 1938, for Coal cutters.

The principal object of the present invention is to provide a coal cutter wherein the cutting teeth are removably mounted so that quick repair and replacement of parts may be made.

Other objects and advantages of the invention will become apparent to the reader of the following specification.

In the drawings,

Figure 1 represents a top plan view of the entire cutter machine making up the subject matter of my copending application Ser. No. 230,116.

Figure 2 is a cross sectional view taken substantially on a line 2—2 of Figure 1.

Figure 3 is a fragmentary perspective view of the cutter chain.

Figure 4 is a sectional view through one of the cutter blocks.

Figure 5 is a transverse sectional view through one of the cutter blocks.

Referring to the drawings wherein like numerals designate like parts, it can be seen that numeral 5 generally refers to the coal cutting machine which makes up the subject matter of my copending application Serial No. 230,116, filed September 15, 1938.

It can be seen that the endless conveyor which is generally referred to by numeral 6 consists of a multiplicity of blocks 13, each of which is cut out as at 39, that is, at each end thereof, to accommodate the adjacent ends of the links 37, and pin members 40 are driven through the end portions of the blocks 13 and through the adjacent ends of the links 37 to pivotally connect the links to the blocks.

Each block has a semi-circular cut out 41 for receiving an arcuate portion of the cutter element 42. This cutter element is in the general shape of the letter L, but has its entire outer edge on the arc of a circle. The projecting portion forms the cutting tooth or hook and this can be offset upwardly or downwardly or projected horizontally as suggested in broken lines in Figure 5 to obtain the proper cutting range.

When the cutting element has been placed in the recess 41 so as to properly project therefrom and the pin or screw 43 has been driven therethrough, the rest of the recess 41 can be blocked off by welding in a plate or stopper 44. This prevents any freedom of movement of the cutter element 42.

It is also to be understood that the recesses 41 are cut in the blocks at different angles to receive the cutting teeth 42. These recesses are cut in certain blocks on a horizontal plane and in others extending upwardly on a 45 degree plane and in others extending downwardly on a 45 degree plane. Thus the teeth project outwardly from the blocks, certain ones on a horizontal plane and others obliquely in an upward direction and other obliquely in a downward direction. Thus the teeth are not bent which would obviously weaken the same.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In a cutting machine, a cutter chain including a plurality of cutting teeth carrying blocks, each of the said blocks being formed with a semi-circular-shaped recess, a substantially disk-shaped cutting element having a segmental portion removed to define a base portion and a projecting portion, a fixed closure for substantially a half portion of the recess and against which the base portion of the tooth can abut, and a member extending through the block and tooth for securing the tooth to the block with its base portion in the recess.

2. A cutting unit for cutting chains comprising a block having a semi-circular shaped opening therein, a substantially three-quarter shaped disk-shaped tooth having a portion disposed into the recess and a portion protruding outwardly, said tooth having substantially a quarter segment removed, a plate partly closing the recess and against which the inner edge portion of the tooth at the removed segment abuts, the outer edge portion of the tooth at the removed segment being curved inwardly of a radial line drawn from the axis of the tooth to the outer point of the tooth.

3. A cutting unit for cutting chains comprising a block having a semi-circular shaped opening therein, a substantially three-quarter shaped disk-shaped tooth having a portion disposed into the recess and a portion protruding outwardly, said tooth having substantially a quarter segment removed, a plate partly closing the recess and against which the inner edge portion of the tooth at the removed segment abuts, the outer edge portion of the tooth at the removed segment being curved inwardly of a radial line drawn from the axis of the tooth to the outer point of the tooth, said tooth having an eccentrically located opening, and a securing element disposed through the block and recess and through the opening in the tooth.

ROBERT T. BAUGH.